Nov. 7, 1972   F. J. TROTTER, JR   3,702,128
SOLIDS FEEDER APPARATUS
Original Filed Nov. 26, 1968

INVENTOR.
FREDERICK J. TROTTER, JR.
BY Stewart N. Rice
ATTORNEY

United States Patent Office

3,702,128
Patented Nov. 7, 1972

---

3,702,128
SOLIDS FEEDER APPARATUS
Frederick J. Trotter, Jr., Bay City, Tex., assignor to Celanese Corporation, New York, N.Y.
Continuation of abandoned application Ser. No. 779,159, Nov. 26, 1968. This application Mar. 26, 1971, Ser. No. 128,522
Int. Cl. B65g 47/16, 33/00
U.S. Cl. 198—64    6 Claims

ABSTRACT OF THE DISCLOSURE

A screw conveyor-type apparatus for feeding granular solids from a feed vessel having a U-trough bottom to a pressurized system via a circular conduit. The apparatus contains a cantilevered feed conveyor screw suspended in the U-trough and extending a portion of the way into the circular conduit as well as an overhead reverse conveyor screw which recycles solids away from the mouth of the circular conduit. The portion of the feed screw within the feed vessel is larger than that portion extending into the circular conduit.

BACKGROUND OF THE INVENTION

The present invention relates to an apparatus for feeding granular solids to a pressurized gas system.

In many industrial systems it is oftentimes required that granular solids be introduced into pressurized gas systems. In such instances it is desirable that the feed system be sealed from the pressurized system and that the introduction of the solids into the pressurized system be accomplished without blow-back from the pressurized system into the feed system. Many devices have been constructed for such types of service however these devices are generally very complicated and as a result are not as reliable as one would desire.

It is thus an object of the present invention to provide an apparatus to move solid materials in granular form into a pressurized gas atmosphere system. It is a further object of the present invention to provide an apparatus for feeding granular solids to a pressurized system which apparatus will prevent pressure blow-back from the pressurized system. Additional objects will become apparent from the following description of the present invention.

SUMMARY

These and other objects are accomplished by the present invention which in one of its embodiments is an apparatus for feeding a granular material from a feed vessel into a system maintained at a higher pressure than said feed vessel, said apparatus being comprised of (a) said feed vessel, the bottom portion of which forms a U-shaped trough substantially conforming in shape to the outside diameter of a feed screw hereafter described, (b) means for introducing a granular material into said feed vessel, (c) a substantially straight conduit of circular cross section and constant diameter openly communicating said feed vessel with said system, said conduit being free of obstructions, (d) a feed screw being coaxial with said conduit, said feed screw extending into said conduit a substantial distance but terminating a substantial distance from the system end of said conduit, said feed screw containing a small diameter section and a large diameter section, the portion of the feed screw which extends into said conduit being at least a part of said small diameter section and said large diameter section lying wholly within said feed vessel, said small diameter section being of solid, uninterrupted flighting and having an outside diameter such that the outer edge of this portion is in close proximity to the inner wall of said conduit, said large diameter section having an outside diameter which is substantially greater than the inside diameter of said conduit, said feed screw being cantilevered from the end opposite said conduit so as to be suspended in said U-shaped trough, (e) at least one reverse screw located within said feed vessel, said reserve screw being substantially parallel to and located above and apart from said feed screw, one end of said reverse screw being near an imaginary plane which passes perpendicularly through the axis of said feed screw at the point where said feed screw enters said conduit, (f) means for turning said feed screw in a direction so as to convey a granular material from said feed vessel into said conduit, and (g) means for turning said reverse screw such that it will convey a granular material in a direction opposite that of said feed screw. The term "granular solids" as used herein is meant to include powders, crystals, and other types of solid particles. The apparatus of the present invention may be utilized to feed wet or dry solids to a pressurized gas system but it is especially useful for handling wet solids.

DESCRIPTION OF THE PREFERRED EMBODIMENTS

Figure 1:
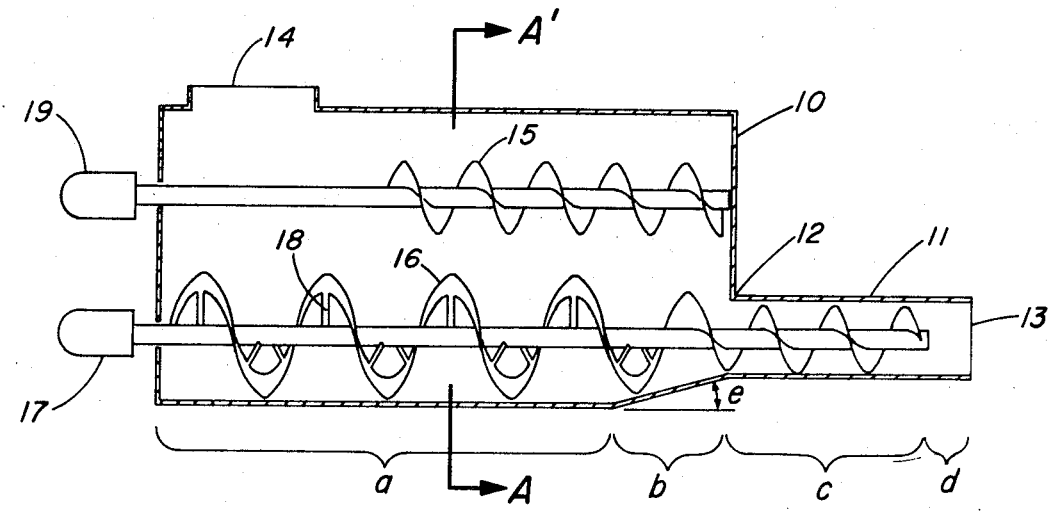
FIG. 1 is a cutaway side view of an apparatus constructed in accordance with the present invention having a double screw arrangement.

In order to more fully describe the present invention, reference is made to FIG. 1 which shows a preferred embodiment of the present invention. The apparatus of FIG. 1 consists of a feed vessel 10 and a straight, circular conduit 11, conduit 11 being attached at one end 12 so as to be in open communication with feed vessel 10, the other end 13 being the end which would be in open communication with the pressurized system being fed. Feed vessel 10 also has a means for introducing a granular material thereto which, in the apparatus of FIG. 1, merely consists of an opening 14 in the top of feed vessel 10. It is of course obvious that various manners could be utilized to introduce the granular material to be handled into feed vessel 10.

Also contained in the apparatus of FIG. 1 is upper reverse screw 15 and lower feed screw 16. At this point the applicant would like to point out that the use of such terms as "upper," "lower," "above," "below," and the like are only relative to the apparatus as shown in the drawing which is the normal operating position with feed screw 16 and reverse screw 15 being horizontal. Referring once again to FIG. 1, feed screw 16 is for the purpose of moving granular material from feed vessel 10 into conduit 11 and is therefore attached to motor means 17 for rotating feed screw 16 about its axis in a direction which will cause granular material located in the feed vessel to move into circular conduit 11. As may be seen feed screw 16 has three sections—(1) a large diameter section *a* located totally within feed vessel 10, (2) a small diameter section *c* located at the end of feed screw 16 which extends a portion of the way into conduit 11 and (3) a tapered section *b* wherein the outside diameter of feed screw 16 tapers from that of the large diameter section down to that of the small diameter section.

In the apparatus of the present invention the small diameter section of feed screw 16 should generally be of solid flighting which is uninterrupted. The pitch of the small diameter section of feed screw 16, as well as that of the other sections of feed screw 16 and of reverse screw 15, may be of standard pitch or may be of a longer or shorter pitch according to the needs of the particular situation. In the apparatus of the present invention the only part of feed screw 16 that should extend into the circular conduit is the small section of constant diameter. The outside diameter of this small diameter section should be substantially that of the inside diameter of circular conduit 11. For example the outside diameter of the small diameter section should be between 90 to 100% of that of the inside diameter of circular conduit 11. Thus if a conduit having a 6 inch inside diameter were utilized, the small diameter section of the feed screw should generally be of about 5½ to 5⅞ inches outside diameter so as to give a $\frac{1}{16}$ to ¼ inch clearance between the feed screw and the conduit wall. The feed screw should extend into the conduit a substantial distance, for example at least two flights but must terminate before reaching the system end (end 13 in FIG. 1) of conduit 11 since there must be a substantial section of conduit adjacent the system end which is unobstructed, the unobstructed portion indicated in FIG. 1 as distance *d*. It is for this reason that the feed screw must be cantilevered as shown in FIG. 1 from the end opposite circular conduit 11. In other words by saying that the feed screw terminates at a point short of the system end of the conduit means not only that the spiral portion of the feed screw terminates but also that the shaft portion of the feed screw terminates at a point within circular conduit 11. Generally the feed screw should protrude into circular conduit a distance at least equal to the inside diameter of the conduit. Likewise the unobstructed portion *d* of the conduit will generally be of an axial length equal to at least 0.75 to 4.0 times the inside diameter of the circular conduit.

As was mentioned above, the portion of feed screw 16 lying within feed vessel 10 is composed of a large diameter section *a* and a tapered section *b*. Also a portion of the small diameter section *c* may be within the feed vessel. When a part of the small diameter section does lie within feed vessel 10, it is preferred that this portion which is external of circular conduit 11 have an axial length of less than the inside diameter of circular conduit 11. In other words the small diameter section should start at just about end 12 of circular conduit 11 so that all or almost all of the small diameter sections is within circular conduit 11.

The outside diameter of the large diameter section of the feed screw must be substantially greater than the inside diameter and is generally 1.5 to 3.0 times greater.

It is preferred that the large diameter section of feed screw 16 purposely be designed so as to have some inefficiencies and it is for this reason that it is not generally desirable to have solid, uninterrupted flighting on this section of feed screw. It is especially preferred that the large diameter section of feed screw 16 be of uninterrupted ribbon flighting design as shown in FIG. 1 wherein a ribbon spiral is carried by short rods 18 so that there is an open space around the shaft of the screw. However in some cases other types of flighting such as interrupted flighting (sometimes referred to as cut-flight spirals) may be utilized. The tapered section of feed screw 16 is merely for the purpose of providing a smooth transition from the large diameter section of the feed screw to the small diameter section of the feed screw and the axial length required to make this transition should usually be equivalent to from ½ to 2 times the outside diameter of the large diameter section.

Figure 2:
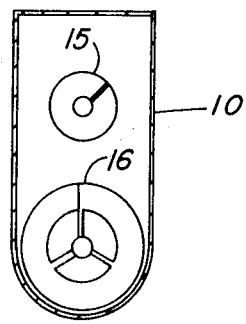
FIG. 2 is an end view of the apparatus of FIG. 1 taken along line A–A'.
Figure 3:
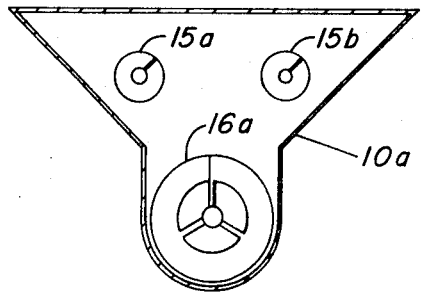
FIG. 3 is an end view of another embodiment of the present invention showing an apparatus having a triple screw arrangement. The same reference characters are used in each of the drawings to denote like features of the apparatus of the present invention.

The feed vessel utilized in apparatus constructed in accordance with the present invention needs to have at least the lower part thereof in the form of a U-shaped trough with the U-shaped trough conforming in shape to the outer diamensions of the feed screw, the width of the trough being slightly larger than the diameter of the screw. Those skilled in the art are aware of the requirements of U-troughs for conventional screw conveyors and the same requirements and considerations apply to the apparatus of the present invention. Usually the U-troughs are such that there is a clearance between the screw and the trough of ½ to 3 inches although it may be about 4 inches in larger size screws. Referring to FIG. 1 it may be seen that the bottom of feed vessel 10 conforms to the shape of feed screw 16 by angling upward at angle *e* so as to conform to the shape of tapered section of feed screw 16. The lower portion of feed vessel 10 needs to form a U-shaped trough but it is not necessary that an entire transverse cross-section from the top to the bottom of the feed vessel be U-shaped. FIG. 2, which is a transverse cross-sectional view taken along lines A–A' of FIG. 1, illustrates that feed vessel 10 is itself a U-shaped trough but FIG. 3 illustrates a transverse cross-section of another suitable configuration for an apparatus of the present invention. In FIG. 3 the lower portion of feed vessel 10*a* forms the desired and necessary U-shaped trough in which feed screw 16*a* is suspended but then the sides of feed vessel 10*a* flare so as to offer more capacity than a feed vessel having vertical sidewalls. In the apparatus of FIG. 3, two reverse screws 15*a* and 15*b* are utilized. The U-shaped trough portion of the feed vessel should however be deep enough to contain at least the lower half of the feed screw preferably at least the lower three-fourths of the feed screw. When handling wet solids it is usually desirable to provide a drain plug in the bottom of the U-shaped trough in order to allow drainage of any liquid which may accumulate therein.

Referring once again to FIGS. 1 and 2, reverse screw 16 is for the purpose of recycling granular material away from the end of feed vessel 10 which communicates with circular conduit 11. This reverse screw and recirculation is necessary in order to prevent forces exerted by the feed screw from packing material into the end of the feed vessel which junctions with the conduit. If packing of material in the end of the feed vessel occurs, it will result in plugging of the apparatus and may cause motor damage or overload. Thus motor means 19 must rotate reverse screw 15 in such a way as to move the granular material in feed vessel 10 in a direction opposite that of feed screw 16. The size and configuration of reverse screw 15 may vary widely and thus reverse screw 15 could have ribbon flighting or solid flighting. The flighting could be interrupted (such as a cut-flight spiral) or uninterrupted. Generally the outside diameter of the reverse screw will be about ⅜ to ⅞ the diameter of the large diameter section of the feed screw. It is not generally necessary for reverse screw 16 to have spiraling along the entire length of feed vessel 10 since its main purpose is to move material away from the end of feed vessel 10 which is connected to circular conduit 11. Although the reverse screw or screws of the apparatus of the present invention must be above the feed screw it does not have to be directly above the feed screw. However it is preferred that when only one reverse screw is utilized, that this reverse screw be directly overhead the feed screw such as is illustrated in FIG. 2. In the apparatus of FIG. 3 wherein two reverse screws 15*a* and 15*b* are utilized, each is above but to the side of feed screw 16*a*. The reverse screw or screws utilized in the apparatus are of course apart and separated from the feed screw, the distance between the outer edge of the reverse screw or screws and the outer edge of the large diameter section of the feed screw usually being equal to about ¼ to 1½ times the diameter of the large diameter section of the feed screw.

In operation of the apparatus of FIG. 1, the granular solid to be fed to a pressurized gas system is added to feed vessel 10 through opening 14. Feed screw 16 provides a positive forward feed of the granular material toward and into circular conduit 11 with the granular material eventually exiting conduit 11 into the pressurized system through end 13. Reverse screw 15 serves to recycle a portion of the granular material away from the end of feed vessel which is attached to conduit 11. In the unobstructed portion of circular conduit 11, the combination of the pressure of feed screw 16 forcing granular material in one direction and the pressure of the pressurized system tending to force the granular material back into the feed vessel causes the creation of a friable "plug" which seals the feed vessel against the pressure of the pressurized gas system. Thus the granular material is actually fed to the pressurized system more in the form of a continuous plug which breaks apart after entering the pressurized system. It is for this reason i.e. to allow the creation of a "plug," that there must be a substantial portion of circular conduit 11 which is free of obstructions as indicated by distance $d$. The length of the unobstructed portion $d$ of conduit 11 between the end of feed screw 16 and conduit end 13 will be dependent upon the flow or packing characteristics of the solid being conveyed—the more flowable the granular solid the longer the unobstructed portion of the circular conduit must be. The length of the unobstructed portion of circular conduit 11 will also be dependent upon the pressure of the system being fed as this pressure causes the "plug" to form and provides the desired positive seal. Since the apparatus of the present invention will normally be started with no granular material therein it is generally desirable to provide a flapper which may be counterweighted over conduit end 13 so as to prevent pressure loss through the feed apparatus. Then as the apparatus is started and granular material progresses through circular conduit 11, the forces exerted lift the flapper to the open position.

EXAMPLE

An apparatus as shown in FIGS. 1 and 2 was utilized to feed wet adipic acid crystals from atmospheric conditions to a dryer maintained at 30 inches water pressure. The large diameter section of feed screw 16 consisted of about 40 inches of ⅔ pitch ribbon flighting having an outside diameter of 12 inches, the ribbon being 2½ inches in width, while the small diameter section which started at about the mouth of circular conduit 11 and extended therein a distance of about 10 inches, was of standard pitch and had solid flighting. The tapered section of feed screw 16 had an axial length of about 10 inches such that angle $e$ in FIG. 1 was about 16°. The clearance between the sides and bottom of the feed vessel trough and the feed screw was about 1 to 1½ inches along both the large diameter section and the tapered section of the feed screw. The inside diameter of circular conduit 11 was 6 inches and the outside diameter of the small diameter section of feed screw 16 was 5¾ inches. The unobstructed portion of circular conduit 11 lying between the end of feed screw 16 and conduit end 13 was about 6 inches in length and a counterweighted flap was utilized over conduit end 13 in order to prevent pressure blowback through the feed apparatus when no adipic acid was being fed. The reverse screw 15 consisted of a single screw of about 7 inches diameter having standard pitch and solid flighting located directly above the feed screw. The outer edge of the reverse screw being about 8 inches apart from the outer edge of the large diameter section of the feed screw. The spiral portion of the reverse screw 15 was about 24 inches in length although the shaft of the reverse screw extended the full length of feed vessel 10.

I claim:
1. An apparatus for feeding a granular material from a feed vessel into a system maintained at a higher pressure than said feed vessel, said apparatus being comprised of
   (a) said feed vessel, the bottom portion of which forms a U-shaped trough substantially conforming in shape to the outside diameter of a feed screw hereafter described,
   (b) means for introducing a granular material into said feed vessel,
   (c) a substantially straight conduit of circular cross section and constant diameter openly communicating said feed vessel with said higher-pressure system, said conduit being free of obstructions,
   (d) a feed screw being coaxial with said conduit, said feed screw extending into said conduit a substantial distance but terminating a substantial distance from the system end of said conduit so as to maintain an obstructed section of said conduit between the system end thereof and the point of termination of said feed screw, said feed screw containing a small diameter section and a large diameter section, the portion of the feed screw which extends into and terminates within said conduit being at least a part of said small diameter section and said large diameter section laying wholly within said feed vessel, said small diameter section being of solid, uninterrupted flighting and having an outside diameter such that the outer edge of this section is in close proximity to the inner wall of said conduit, said large diameter section having an outside diameter which is substantially greater than the inside diameter of said conduit, said feed screw being cantilevered from the end opposite said conduit so as to be suspended in said U-shaped trough,
   (e) at least one reverse screw located within said feed vessel, said reverse screw being substantially parallel to and located above and apart from said feed screw, one end of said reverse screw being near an imaginary plane which passes perpendicularly through the axis of said feed screw at the point where said feed screw enters said conduit,
   (f) means for turning said feed screw in a direction so as to convey a granular material from said feed vessel into said conduit, and
   (g) means for turning said reverse screw such that it will convey a granular material in a direction opposite that of said feed screw.

2. The apparatus of claim 1 wherein said large diameter section of the feed screw has uninterrupted ribbon flighting, said feed screw containing a tapered section which connects said large diameter section with said small diameter section and in which tapered section the outside diameter of said feed screw tapers from that of the large diameter section to that of the small diameter section.

3. The apparatus of claim 2 wherein said large diameter section of the feed screw has an outside diameter which is about 1.5 to 3.0 times the inside diameter of said conduit and wherein said feed screw terminates within said conduit at a point such that the distance between the end of said feed screw and said system end of said conduit is at least ¾ the inside diameter of said conduit.

4. The apparatus of claim 3 wherein said small diameter section starts at approximately the junction of said conduit and said feed vessel and extends into said conduit a distance which is at least equal to the inside diameter of said conduit, and wherein the axial length of said tapered section of the feed screw is about 0.5 to 2.0 times the outside diameter of said feed screw.

5. The apparatus of claim 4 wherein said reverse screw has an outside diameter equal to about ⅜ to ⅞ the outside diameter of the large diameter section of said feed screw and wherein the outer edge of said reverse screw is separated from the outer edge of said large diameter section by a distance equal to from ¼ to 1½ times the diameter of said large diameter section.

6. The apparatus of claim 5 wherein said reverse screw has solid, uninterrupted flighting.

References Cited
UNITED STATES PATENTS
| | | | |
|---|---|---|---|
| 2,352,749 | 7/1944 | Wills | 222—238 |
| 3,411,675 | 11/1968 | Wahl | 198—214 |

RICHARD E. AEGERTER, Primary Examiner

U.S. Cl. X.R.

198—213